US008352355B2

(12) United States Patent
Ettl et al.

(10) Patent No.: US 8,352,355 B2
(45) Date of Patent: Jan. 8, 2013

(54) CONFIGURATION PRICING STRATEGIES FOR MULTI-COMMODITY REQUEST-FOR-QUOTES

(75) Inventors: Markus R. Ettl, Yorktown Heights, NY (US); Karthik Sourirajan, White Plains, NY (US); Zhengliang Xue, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 13/106,474

(22) Filed: May 12, 2011

(65) Prior Publication Data

US 2012/0290500 A1   Nov. 15, 2012

(51) Int. Cl.
*G06Q 40/00* (2012.01)
(52) U.S. Cl. .......................... 705/37; 705/26.1
(58) Field of Classification Search .................. 705/37, 705/26.1
See application file for complete search history.

(56) References Cited

U.S. PATENT DOCUMENTS

| | | | |
|---|---|---|---|
| 6,963,854 B1 | 11/2005 | Boyd et al. | |
| 7,082,411 B2 * | 7/2006 | Johnson et al. | 705/37 |
| 7,139,733 B2 | 11/2006 | Cao et al. | |
| 7,506,001 B2 * | 3/2009 | Johnson et al. | 707/792 |
| 7,526,442 B2 * | 4/2009 | Edgar et al. | 705/35 |
| 7,844,535 B2 * | 11/2010 | Guler et al. | 705/37 |
| 2003/0093357 A1 * | 5/2003 | Guler et al. | 705/37 |
| 2003/0195832 A1 * | 10/2003 | Cao et al. | 705/37 |
| 2003/0220773 A1 | 11/2003 | Haas et al. | |
| 2004/0215550 A1 * | 10/2004 | Preist et al. | 705/37 |
| 2007/0143171 A1 * | 6/2007 | Boyd et al. | 705/10 |
| 2009/0171726 A1 * | 7/2009 | Johnson et al. | 705/7 |
| 2009/0177589 A1 * | 7/2009 | Edgar et al. | 705/36 R |
| 2010/0114716 A1 * | 5/2010 | Heilig et al. | 705/14.71 |
| 2010/0191580 A1 * | 7/2010 | Chatter et al. | 705/10 |
| 2010/0250391 A1 * | 9/2010 | Yruski et al. | 705/26 |
| 2012/0185347 A1 * | 7/2012 | Hearnes, II | 705/26.3 |

OTHER PUBLICATIONS

McFadden, D., "Conditional Logit Analysis of Qualitative Choice Behavior" P. Zarembka P, ed. Frontiers in Econometrics Academic Press, New York, (1974) pp. 105-142, vol. 1, issue 2.
Agrawal, V. et al., "Bid-Response Models for Customized Pricing" Journal of Revenue & Pricing Management (2007) pp. 212-228, vol. 6, No. 3.
Adams, W.J. et al., "Commodity Bundling and the Burden of Monopoly" The Quarterly Journal of Economics (1976) pp. 475-498, vol. 90, No. 3.
Chu, C.S. et al., "Nearly Optimal Pricing for Multiproduct Firms" Working paper, Stanford University (2007).

* cited by examiner

*Primary Examiner* — Jagdish Patel
*Assistant Examiner* — Sara C Hamilton
(74) *Attorney, Agent, or Firm* — Scully, Scott, Murphy & Presser, P.C.; Daniel P. Morris, Esq.

(57) ABSTRACT

Win probability estimation model that statistically computes the probability of winning a bid at a given price, and profit optimization models that compute the optimal price for a bid balancing the probability of winning a bid at a price with the profitability of the bid at the given price. In one stage, an expected profit margin of a product may be formulated as a function of its profit margin and win probability to compute its optimal profit margin. In another stage, an expected profit for one or more product accessories may be formulated as a function of the profit margin and their conditional win probability given the server win to compute their optimal profit margins. The conditional win probabilities for the product accessories may be modeled as a function of the utilities of the various purchase options that contain the product and that accessory.

21 Claims, 2 Drawing Sheets

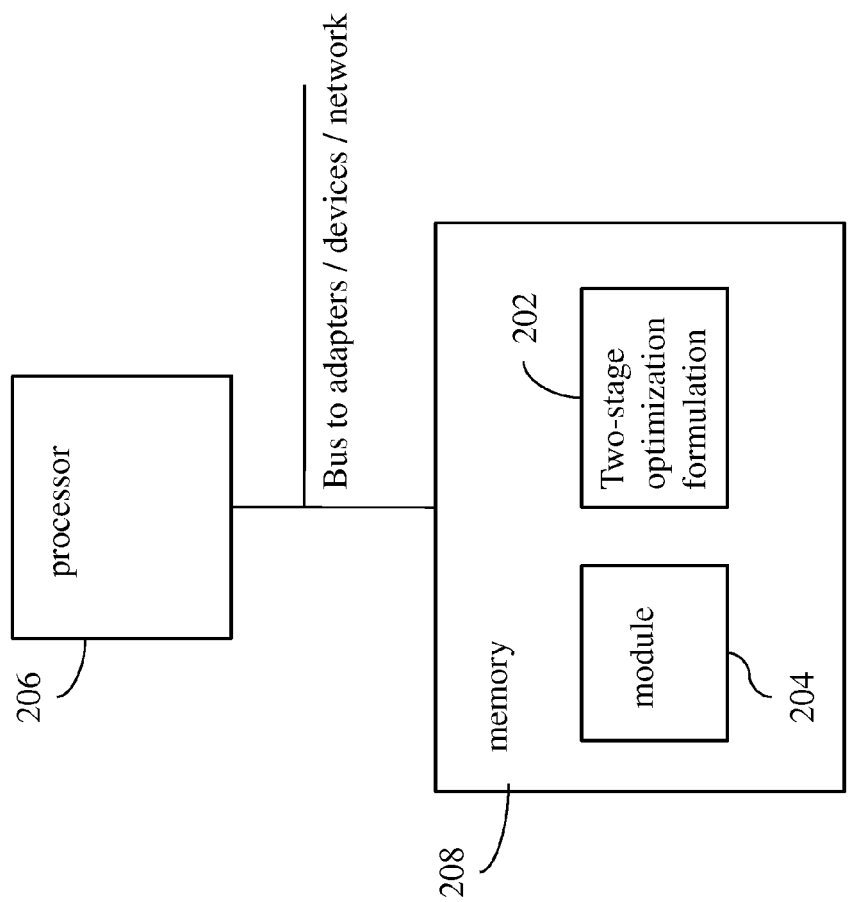

CONFIGURATION PRICING STRATEGIES FOR MULTI-COMMODITY REQUEST-FOR-QUOTES

FIELD

The present application generally relates to computer implemented pricing methodologies, and more particularly to configuration pricing strategies for multi-commodity request-for-quotes.

BACKGROUND

Market-based pricing in an environment of configured products and complex, unique bids with multiple products, presents challenges not found in single commodity purchasing environments. McFadden (McFadden, D. 1974. Conditional logit analysis of qualitative choice behavior. P. Zarembka, ed. Frontiers in Econometrics. Academic Press, New York, 105-142) and Agrawal and Ferguson (Agrawal, V., M. Ferguson. 2007. Bid-response models for customized pricing. Journal of Revenue & Pricing Management 6(3), 212-228) use the multinomial logit model to study buyer responses to a single product bid request. Adams and Yellen (Adams, W. J., J. L. Yellen. 1976. Commodity bundling and the burden of monopoly. The Quarterly Journal of Economics 90(3) 475-498) and Chu et al. (Chu, C. S., P. Leslie, and A. Sorensen. 2007. Nearly optimal pricing for multiproduct firms. Working paper, Stanford University) study product bundling models, but focus on the complete execution policy. They do not provide a study on the unconstrained execution policy for multi-commodity bid configurations, which might entail "cherry-picking" of products within a bid configuration by prospective buyers.

BRIEF SUMMARY

Configuration pricing strategies for multi-commodity request-for-quotes may be provided. In one embodiment, method and system are provided for estimating prices for each line item in a multi-commodity request-for-quote. The method in one aspect may include receiving a request for quote for a bid configuration including a product k and a plurality of accessory items l associated with the product k, and determining product k's win probability $q_k$ at a given price. The method may also include determining an expected profit margin and approved price of the product k as a function of product k's profit margin $z_k$ and said product k's win probability $q_k$. The method may further include determining accessory item l's conditional win probability $q_{lk}$ given the product k's win probability $q_k$. The method may yet further include determining an expected profit margin of each of the plurality of accessory items l as a function of accessory item l's profit margin $z_l$ and the accessory item l's conditional win probability $q_{lk}$, and determining prices for the product and each of the plurality of accessory items by solving an optimization formulation that is a function of a sum of the expected profit margin of the product and the expected profit margin of one or more of the accessory items.

A system for estimating prices for each line item in a multi-commodity request-for-quote, in one aspect, may include a module operable to receive a request for quote for a bid configuration including a product k and a plurality of accessory items l associated with the product k. The module may be further operable to determine product k's win probability $q_k$ at a given price, and determine an expected profit margin and approved price of the product k as a function of product k's profit margin $z_k$ and said product k's win probability $q_k$. The module also may be operable to determine accessory item l's conditional win probability $q_{lk}$ given the product k's win probability $q_k$, and determine an expected profit margin of each of the plurality of accessory items l as a function of accessory item l's profit margin $z_l$ and the accessory item l's conditional win probability $q_{lk}$. The module may be further operable to determining prices for the product and each of the plurality of accessory items by solving an optimization formulation that is a function of a sum of the expected profit margin of the product and the expected profit margin of one or more of the accessory items.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 2 is a system diagram illustrating components in one embodiment of the present disclosure.

DETAILED DESCRIPTION

Figure 1:
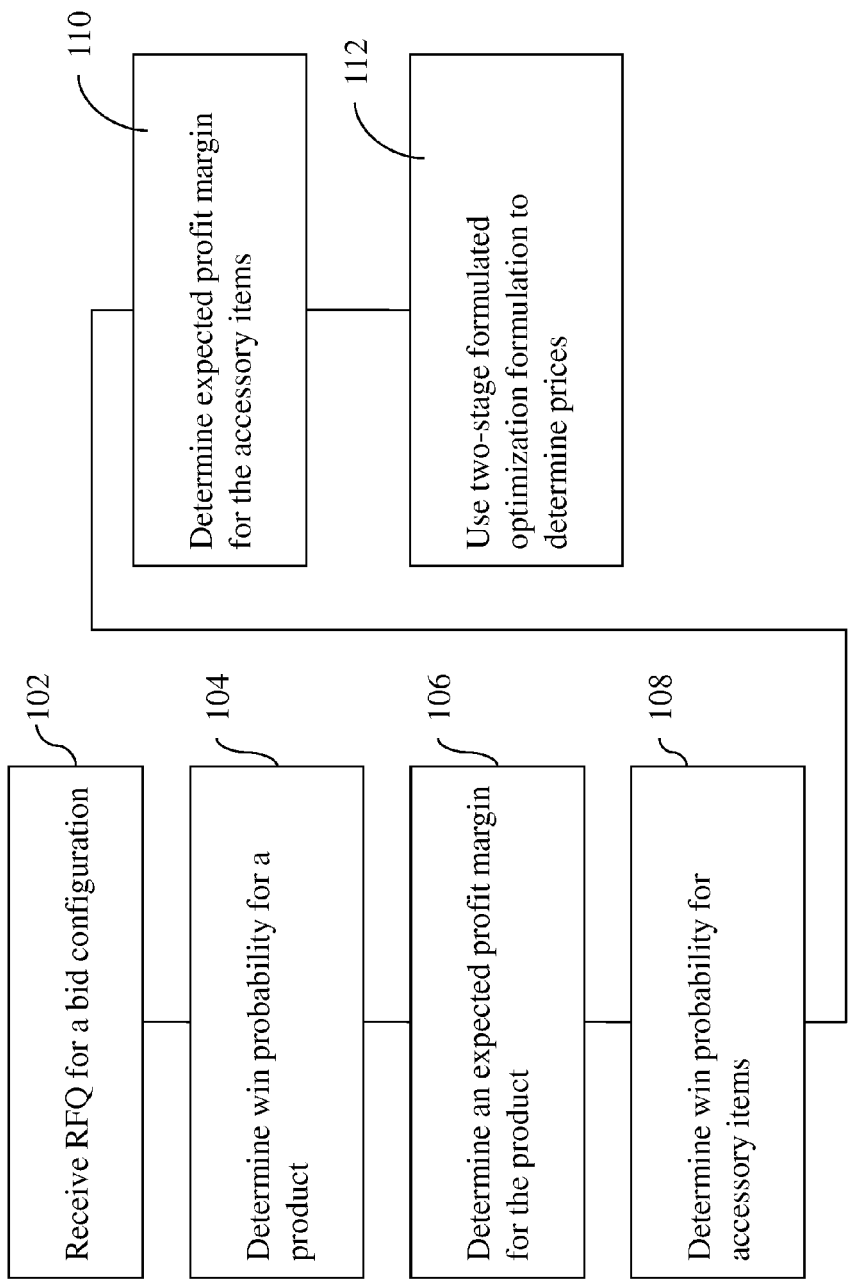
FIG. 1 is a flow diagram that illustrates method of the present disclosure in one embodiment.

The present disclosure in one aspect describes a method that detects price sensitivities to develop a pricing strategy that may be optimal and that may maximize expected gross profits. This method may increase the effectiveness of a seller's transaction bid activity with a higher win rate and at the highest possible profit from wins. In the present disclosure in one embodiment, win probability estimation models are developed that statistically compute the probability of winning a bid at a given price, and profit optimization models are developed that compute the optimal price for a bid by balancing the probability of winning a bid at a price with the profitability of the bid at the given price.

As an example, a request-for-quote (RFQ) pricing process for products, in this example, computer servers, may involve the following. A bid configuration may include product specificity such as a server computer and a set of server accessories such as memory and hard drives. A buyer submits an RFQ for a desired quantity and requested price for each product as bid configuration to a seller. The seller reviews the products in the bid configuration and offers an approved price for each product to the buyer. The buyer then decides whether to execute the bid at the approved price.

There may be three possible regimes underlying bid execution: complete execution, conditional execution and unconstrained execution. Complete execution requires the buyer to purchase the whole configuration. Conditional execution imposes some conditions on the execution (e.g.: requiring the buyer to execute at least 80% of the total bid). Unconstrained execution allows the buyer to selectively buy any product in any quantity from the bid configuration at the approved price. In the methodology of the present disclosure in one embodiment, three possible bidding outcomes may be observed: lost bids, partially won bids or completely won bids. The methodology of the present disclosure may use this data to optimize the pricing strategies to maximize the total expected profit for the bid configuration A price optimization procedure or component may compute the optimal price for a bid configuration by balancing the probability of winning at a price with the business objective such as revenue and profitability. An algorithm that performs price optimization may segment historical bids into similar clusters, statistically compute the probability of winning a bid over a range of prices, and determine the optimal price for each product. The price optimization of the present disclosure in one aspect may capture the impact of unconstrained execution by customer via win probability models that consider all possible purchasing scenarios and perform joint price optimization of all products in a bid configuration.

In the present disclosure, in one embodiment, an unconstrained execution policy for multi-commodity bid configurations is considered, which may entail "cherry-picking" of products within a bid configuration by prospective buyers. The methodology in one embodiment of the present disclosure formulates an extended multinomial logit model that models the win probability of a product as a function of the market value and price of that product, and all the other products in the same bid configuration.

The seller offers an approved price for each product and then the buyer can purchase any subset of the bid configuration, following the unconstrained execution policy. A buyer purchase option is defined as a subset of products that can be purchased by the buyer from a given configuration. The method of the present disclosure in one aspect estimates the win probability of a product, which is the likelihood of the buyer purchasing a product, as an extended multinomial logit function of the buyer utilities for the various purchase options that includes the product and the buyer utility for the non-purchase option.

This will help the seller obtain higher profits through differentiated pricing strategies based on the entire bid configuration, as opposed to pricing the products individually.

However, as the numbers of products increase, the computational complexity increases exponentially. Therefore, the method of the present disclosure may obtain near-optimal pricing strategies using simpler formulations of the win probabilities.

A model of the present disclosure is described in more detail below.

The present disclosure focuses, by way of an example, on a buyer submitting an RFQ for a bid configuration including a server and a set of server accessories. The seller offers an approved price for each product and then the buyer can purchase any subset of the bid configuration, following the unconstrained execution policy. We define a buyer purchase option as a subset of products that can be purchased by the buyer from a given configuration.

We estimate the win probability of a product, which is the likelihood of the buyer purchasing a product, as an extended multinomial logit function of the buyer utilities for the various purchase options that includes the product and the buyer utility for the non-purchase option (which we set to zero). We model the buyer utility for a purchase option as a function of the following in one embodiment of the present disclosure:

Profit margin at the approved price for each product in the purchase option.

List price for each product in the purchase option.

Manufacturing cost for each product in the purchase option.

Contribution ratio for each product in the purchase option. The contribution ratio is given by the ratio of the manufacturing cost of that product to the sum of the manufacturing costs of all products in the configuration.

Competitive advantage for each product in the purchase option. The market value of the product is signaled by the list price, which is known to all buyers. We use the ratio of list price to manufacturing cost as a measure of the degree of competitive advantage. The higher the ratio, the more profitability the company can achieve.

Consider a company that offers J products to I customers. The customers are indexed by $i \in I = \{1, \ldots, I\}$, and products are indexed by $j \in J = \{1, \ldots J\}$. Here all vectors, expressed by boldface letters, are J-dimensional column vectors, for instance $v = \{v_j\}_{j \in J}$. We use $v_S$ to denote a subvector of $v$ whose component indices are restricted to the subset S.

Consider customer i ordering the configuration $C \subset J$, and the company offering the price $p_C$. Let $q_j(p_C)$ be the company's win probability, which is the likelihood of a buyer purchasing product j at the price of $p_C$, for any $j \in C$. The company estimates the win probability based on the following information: the (approval) price $p_j$, list price $\bar{p}_j$, manufacturing cost $c_j$, and cost weight $w_j = c_j / \Sigma_{k \in C} c_k$. The market value of the product is signaled by the list price $\bar{p}_j$, which is common knowledge for all buyers and all competitors. Let $\xi_j = \bar{p}_j / c_j$ be the ratio of list price to manufacturing cost, measuring the degree of competitive advantage.

As an example, a simple bid configuration is considered, which includes a server k and a set of server accessories $l \in L$. The company offers the approval price $p_C = \{p_k, p_L\}$. A buyer achieves a net utility $\tilde{U}_c$ when purchasing the whole bid configuration.

$$\tilde{U}_C = \Theta_C - \gamma_1 \sum_{j \in C} p_j + \varepsilon = U_C + \varepsilon, \text{ where } \Theta_C = \sum_{j \in C} \Theta_j.$$

Observing the company's approval price $p_C$, the customer might buy a subset of the whole configuration $S \in C$. Now we estimate the value of each subset, $\Theta_S$. However, the value of the subset depends on the correlation among products. Therefore, we further investigate such correlation, $\Theta_S = g(\{\Theta_j\}_{j \in S})$. Here we impose the following assumption on the correlation between the server and its accessories.

Assume the configuration includes a server k and its server accessory set L. Consider any product combination $S \in C$. We assume $\Theta_S = -\infty$, if k is not in S, and $\Theta_S = \Sigma_{j \in S} \Theta_j$, if $k \in S$.

Define $\Theta_j$ as the quality of product j, which is a function of the list price and the manufacturing cost of product j. $\Theta_j = \gamma_2 c_j + \gamma_3 (\bar{p}_j - c_j)$. Here, we assume it takes more effort and cost to make the product of higher quality. Moreover, the market value is signaled by the market price, which is characterized by the list price $\bar{p}_j$.

We construct the utility function normalized by the configuration cost $\Sigma_{j \in C} c_j$. If the customer makes the purchase decision $S \subset C$, where $k \in S$, we have the following utility function, $\tilde{u}_S = \theta_S - \beta_1 \Sigma_{j \in S} \{w_j z_j\} + \varepsilon = u_S + \varepsilon$, where $z_j = (\bar{p}_j - c_j)/c_j$ is the percentage profit margin, and $\theta_S = \Sigma_{j \in S} \{w_j (\beta_{0j} + \beta_{2j} \xi_j)\}$ is proportional to the competitive advantage $\xi_j$, for any $j \in S$.

Now we extend the logit model to formulate the win probability of each product. Let F be the set of all the possible purchase options, where 0 is the non purchase option, with $u_0 = 0$. Let $F(\{j\})$ be the set of all the purchase options that contains product j. For example, assume we have three products denoted by 1, 2 and 3, then the index set $J = \{1,2,3\}$. We have $F = \{\{0\}, \{1\}, \{1,2\}, \{1,3\}, \{1,2,3\}\}$, $F(\{1\}) = \{\{1\}, \{1,2\}, \{1,3\}, \{1,2,3\}\}$, and $F(\{1,2\}) = F(\{1\}) \cap F(\{2\}) = \{\{1,2\}, \{1,2,3\}\}$.

We have the win probability of server k, $q_k = \Sigma_{S \in F(\{k\})} \exp(u_S)/(\exp(0) + \Sigma_{S \in F(\{k\})} \exp(u_S))$. Also we obtain the joint win probability of the server k and server accessory l: $q_{kl} = \Sigma_{S \in F(\{k,l\})} \exp(u_S)/(\exp(0) + \Sigma_{S \in F(\{k\})} \exp(u_S))$. Similarly, we can define the win probability of any of the product combinations. However, when the numbers of products increase, the computational complexity increases exponentially. Therefore, we consider a heuristic model to simplify the solution of the pricing optimization problem.

In one embodiment, we assume that a buyer would not purchase any server accessory in the absence of the server, because its value is completely tied to the server. Under this assumption, we set the win probability for such purchase options to zero. Therefore, we assume that a bid configuration does not generate any sales unless the server has been executed. Next, we establish a two stage optimization model to maximize the expected profit of the whole bid configuration. In the first stage, we formulate the expected profit of the server as the product of its profit margin and win probability to compute its optimal profit margin and its optimal approved price. In the second stage, we formulate the expected profit for the server accessories as the product of the profit margin and the conditional win probability, given that the buyer purchases the server, to compute their optimal profit margins and their optimal approved prices. The conditional win probability of a server accessory is modeled as a function of the utilities of the various purchase options that contain the server and that accessory.

Now we further explore the correlation among these products and optimize the pricing strategy. Normally a bid configuration consists of a server and a set of server accessories. To simplify the analysis, we consider a configuration that includes a server k and several server accessories l. Here we establish a two stage optimization model to maximize the expected profit of the whole configuration.

Let $q_{lk} = Pr(k, l \in S)$ be the probability of winning both server k and server accessory j. Let $q_{l|k} = Pr(l \in S | k \in S)$ be the conditional probability of winning the server accessory j, given that the buyer purchases the server. We also assume that the customers would not purchase the server accessory in the absence of the server, because its value is completely tied with the server. That is $Pr(l \in S | k$ not in $S) = 0$. The expected profit may be formulated as follows:

$$\prod_b (z_k, z_L) = \left(z_k + \sum_{l \in L}(z_l q_{l|k})\right) q_k = z_k q_k + \sum_{l \in L}(z_l q_{lk}). \quad (1)$$

The complexity of the optimization depends on the formulation of the win probability, $q_k$ and $q_{lk}$. However, as the numbers of products increase, the computational complexity increases exponentially. Therefore, we aim to obtain near-optimal pricing strategies using simpler formulations of the win probabilities.

The following hypotheses, $H_1$ and $H_2$, reduce the computational complexity of the problem and simplify the pricing optimization problem.

We assume $H_1$: $q_k$ depends on its own profit margin $z_k$, but not on the profit margin of its server accessories, $z_L$.

$H_2$: $q_{lk}$ depends on its own profit margin $z_l$ and the server's margin $z_k$, but not on the profit margin of the other server accessories $z_{L \setminus \{l\}}$.

The win probability is expressed in the form of $q_k(z_k)$ and $q_{lk}(z_k, z_l)$. Then we can optimize the configuration price in two steps:

$$\prod_b^* (z_k, z_L) = \max_{z_k}\left(z_k q_k + \max_{z_L}\sum_{l \in L}(z_l q_{lk})\right), \quad (2)$$

where $q_k(\hat{z}_k) = \dfrac{\exp(\theta_k - \beta_k \hat{z}_k)}{1 + \exp(\theta_k - \beta_k \hat{z}_k)}$, and $q_{lk}(\hat{z}_k, \hat{z}_l) = \dfrac{\exp(\theta_l - \beta_{lk}\hat{z}_k - \beta_{ll}\hat{z}_l)}{1 + \exp(\theta_l - \beta_{lk}\hat{z}_k - \beta_{ll}\hat{z}_l)}$.

Here $\hat{z}_j = w_j * z_j$, for any $j \in C$.

FIG. 1 is a flow diagram that illustrates a method of the present disclosure in one embodiment. At 102, a request for quote for a bid configuration listing a product (k) of interest and associated accessory items (l) may be received. While the above description explained the method and system of the present disclosure using a server as a product and server accessories as accessory items, it is noted that the method and system of the present disclosure may be applied for any other products and/or services.

At 104, product k's win probability $q_k$ at a given price may be determined. For instance, a win probability of a product, which is the likelihood of a buyer purchasing the product may be estimated as an extended multinomial logit function of the buyer utilities for the various purchase options that includes the product and the buyer utility for the non-purchase option, which in one embodiment, is set to zero. The buyer utility may be modeled as described above.

At 106, an expected profit margin and approved price of the product k may be determined as a function of product k's profit margin $z_k$ and product k's win probability $q_k$. As explained above, this step may compute the optimal profit margin for the product, and may represent a first stage optimization in one embodiment of the present disclosure.

At 108, accessory item l's conditional win probability $q_{l|k}$ given the product k's win probability $q_k$ may be determined. This represents a joint win probability of product k and one or more accessory items l.

At 110, an expected profit margin may be determined of each of the plurality of accessory items l as a function of accessory item l's profit margin $z_l$ and the accessory item l's conditional win probability $q_{l|k}$. As explained above, this step may compute the optimal profit margins for accessory items, and may represent a second stage optimization in one embodiment of the present disclosure At 112, prices may be determined for the product and each of the plurality of accessory items by solving an optimization formulation that is a function of a sum of the expected profit margin of the product and the expected profit margin of one or more of the accessory items.

FIG. 2 is a system diagram illustrating components in one embodiment of the present disclosure. The system in one embodiment may include a processor 206 that can execute a program of instructions. The system may include a memory device 208 that stores a program of instructions, or a computer executable module which may be loaded onto the processor for execution. The module 204 may receive a request for quote for a bid configuration including a product k and a plurality of accessory items l associated with the product k. The module 204 may further determine product k's win probability $q_k$ at a given price. The module 204 may yet further determine an expected profit margin and approved price of the product k as a function of product k's profit margin $z_k$ and product k's win probability $q_k$.

The module 204 may further determine accessory item l's conditional win probability $q_{l|k}$ given the product k's win probability $q_k$. The module 204 may also determine an expected profit margin of each of the plurality of accessory items l as a function of accessory item l's profit margin $z_l$ and the accessory item l's conditional win probability $q_{lk}$.

The module 204 may determine prices for the product and each of the plurality of accessory items by solving an optimization formulation 202 for an expected profit of the bid configuration. The optimization formulation 202 may be a function of the sum of the expected profit margin of the product and the expected profit margin of one or more of the accessory items.

The method of the present disclosure may allow a customer to buy any subset of products. Also, different purchasing scenarios may be modeled within the win probability models, including for example, joint price optimization of server and options. Trade-off between main product (e.g., server) and option (e.g., accessories) prices may be captured accurately.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of estimating prices for each line item in a multi-commodity request-for-quote, comprising:

receiving a request for quote for a bid configuration including a product k and a plurality of accessory items l associated with the product k;

determining product k's win probability $q_k$ at a given price;

determining an expected profit margin and approved price of the product k as a function of product k's profit margin $z_k$ and said product k's win probability $q_k$;

determining accessory item l's conditional win probability $q_{l|k}$ given the product k's win probability $q_k$;

determining an expected profit margin of each of the plurality of accessory items l as a function of accessory item l's profit margin $z_l$ and the accessory item l's conditional win probability $q_{l|k}$; and determining, by a processor, prices for the product and each of the plurality of accessory items by solving an optimization formulation that is a function of a sum of the expected profit margin of the product and the expected profit margin of one or more of the accessory items.

2. The method of claim 1, wherein the optimization formulation is formulated under constraints that the win probability of the product $q_k$ depends on the profit margin of the product $z_k$, but not on profit margin of accessory items $z_L$ in the bid configuration, and that the conditional win probability of an accessory item $q_{lk}$ depends on the profit margin of the accessory item $z_l$ and the product's profit margin $z_k$, but not on the profit margin of other one or more accessory items $z_{L\setminus\{l\}}$ in the bid configuration.

3. The method of claim 1, wherein the conditional win probabilities for an accessory item is modeled as a function of utilities of one or more purchase options that contain the product and the accessory item.

4. The method of claim 3, wherein the utilities of one or more purchase options are functions of:
 a profit margin at an approved price for each accessory item in a purchase option;
 a list price for said each accessory item in the purchase option;
 a manufacturing cost for said each accessory item in the purchase option;
 a contribution ratio for said each accessory item in the purchase option; and
 a competitive advantage for said each accessory item in the purchase option.

5. The method of claim 4, wherein the contribution ratio for said each accessory item in the purchase option is determined as a ratio of the manufacturing cost to a sum of manufacturing costs of all accessory items in the purchase option.

6. The method of claim 4, wherein the competitive advantage for said each accessory item in the purchase option is determined as a ratio of the list price to the manufacturing cost.

7. The method of claim 1, wherein the optimization formulation includes $$\prod_{b}^{*}(z_k, z_L) = \max_{z_k}\left(z_k q_k + \max_{z_L} \sum_{l \in L}(z_l q_{lk})\right)$$

where $$\prod_{b}^{*}(z_k, z_L)$$

represents prices at profit margins $z_k$ associated with the product k and $z_L$ associated with the accessory items $l \in L$.

8. A system for estimating prices for each line item in a multi-commodity request-for-quote, comprising:
 a processor;
 a module operable to execute on the processor and further operable to receive a request for quote for a bid configuration including a product k and a plurality of accessory items l associated with the product k,
 the module further operable to determine product k's win probability $q_k$ at a given price, and determine an expected profit margin and approved price of the product k as a function of product k's profit margin $z_k$ and said product k's win probability $q_k$;
 the module further operable to determine accessory item l's conditional win probability $q_{lk}$ given the product k's win probability $q_k$, and determine an expected profit margin of each of the plurality of accessory items l as a function of accessory item l's profit margin $z_l$ and the accessory item l's conditional win probability $q_{lk}$, and
 the module further operable to determining prices for the product and each of the plurality of accessory items by solving an optimization formulation that is a function of a sum of the expected profit margin of the product and the expected profit margin of one or more of the accessory items.

9. The system of claim 8, wherein the optimization formulation is formulated under constraints that the win probability of the product $q_k$ depends on the profit margin of the product $z_k$, but not on profit margin of the accessory items $z_L$, and that the conditional win probability of an accessory item $q_{lk}$ depends on the profit margin of the accessory item $z_l$ and the product's profit margin $z_k$, but not on the profit margin of other one or more accessory items $z_{L\setminus\{l\}}$ in the bid configuration.

10. The system of claim 8, wherein the conditional win probabilities for an accessory item is modeled as a function of utilities of one or more purchase options that contain the product and the accessory item.

11. The system of claim 10, wherein the utilities of one or more purchase options are functions of:
 a profit margin at an approved price for each accessory item in a purchase option;
 a list price for said each accessory item in the purchase option;
 a manufacturing cost for said each accessory item in the purchase option;
 a contribution ratio for said each accessory item in the purchase option; and
 a competitive advantage for said each accessory item in the purchase option.

12. The system of claim 11, wherein the contribution ratio for said each accessory item in the purchase option is determined as a ratio of the manufacturing cost to a sum of manufacturing costs of all accessory items in the purchase option.

13. The system of claim 11, wherein the competitive advantage for said each accessory item in the purchase option is determined as a ratio of the list price to the manufacturing cost.

14. The system of claim 8, wherein the optimization formulation includes $$\prod_{b}^{*}(z_k, z_L) = \max_{z_k}\left(z_k q_k + \max_{z_L} \sum_{l \in L}(z_l q_{lk})\right)$$

where $$\prod_{b}^{*}(z_k, z_L)$$

represents prices at profit margins $z_k$ associated with the product k and $z_L$ associated with the accessory items $l \in L$.

15. A computer readable storage medium storing a program of instructions executable by a machine to perform a method of estimating prices for each line item in a multi-commodity request-for-quote, comprising:
 receiving a request for quote for a bid configuration including a product k and a plurality of accessory items l associated with the product k;
 determining product k's win probability $q_k$ at a given price;

determining an expected profit margin and approved price of the product k as a function of product k's profit margin $z_k$ and said product k's win probability $q_k$;

determining accessory item l's conditional win probability $q_{l|k}$ given the product k's win probability $q_k$;

determining an expected profit margin of each of the plurality of accessory items l as a function of accessory item l's profit margin $z_l$ and the accessory item l's conditional win probability $q_{l|k}$; and determining, by a processor, prices for the product and each of the plurality of accessory items by solving an optimization formulation that is a function of a sum of the expected profit margin of the product and the expected profit margin of one or more of the accessory items.

16. The computer readable storage medium of claim 15, wherein the optimization formulation is formulated under constraints that the win probability of the product $q_k$ depends on the profit margin of the product $z_k$, but not on profit margin of the accessory items $z_L$, and that the conditional win probability of an accessory item $q_{l|k}$ depends on the profit margin of the accessory item $z_l$ and the product's profit margin $z_k$, but not on the profit margin of other one or more accessory items $z_{L \setminus \{l\}}$ in the bid configuration.

17. The computer readable storage medium of claim 15, wherein the conditional win probabilities for an accessory item is modeled as a function of utilities of one or more purchase options that contain the product and the accessory item.

18. The computer readable storage medium of claim 17, wherein the utilities of one or more purchase options are functions of:

a profit margin at an approved price for each accessory item in a purchase option;

a list price for said each accessory item in the purchase option;

a manufacturing cost for said each accessory item in the purchase option;

a contribution ratio for said each accessory item in the purchase option; and a competitive advantage for said each accessory item in the purchase option.

19. The computer readable storage medium of claim 18, wherein the contribution ratio for said each accessory item in the purchase option is determined as a ratio of the manufacturing cost to a sum of manufacturing costs of all accessory items in the purchase option.

20. The computer readable storage medium of claim 18, wherein the competitive advantage for said each accessory item in the purchase option is determined as a ratio of the list price to the manufacturing cost.

21. The computer readable storage medium of claim 15, wherein the optimization formulation includes $$\prod_{b}^{*}(z_k, z_L) = \max_{z_k}\left(z_k q_k + \max_{z_L} \sum_{l \in L}(z_l q_{l|k})\right)$$

where $$\prod_{b}^{*}(z_k, z_L)$$

represents prices at profit margins $z_k$ associated with the product k and $z_L$ associated with the accessory items $l \in L$.

* * * * *